Nov. 3, 1964  V. S. BUCCICONE  3,155,387
SHEET HANDLING APPARATUS
Filed Oct. 9, 1962  3 Sheets-Sheet 1
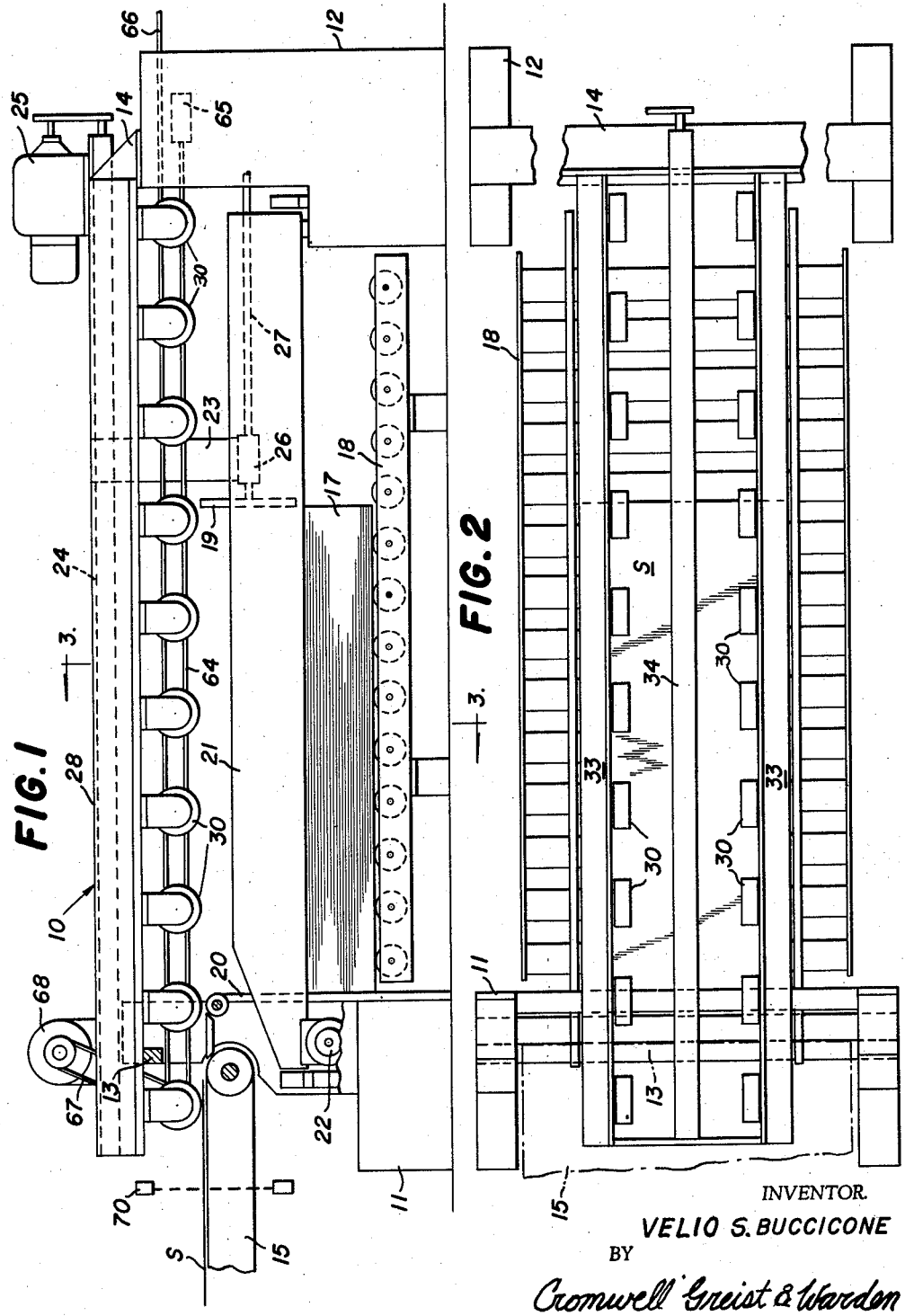
INVENTOR.
VELIO S. BUCCICONE
BY
Cromwell Greist & Warden
ATTYS.

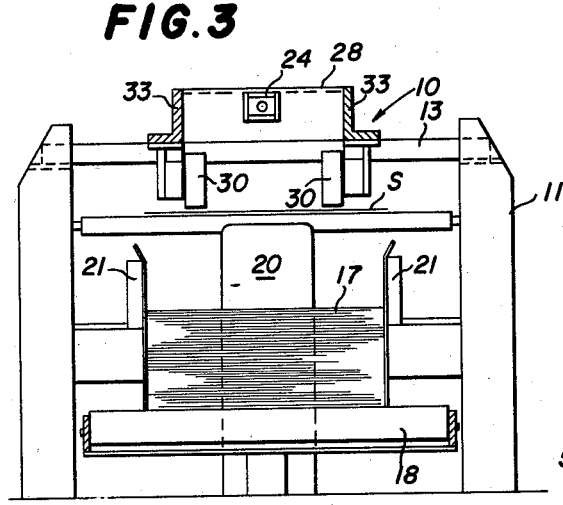
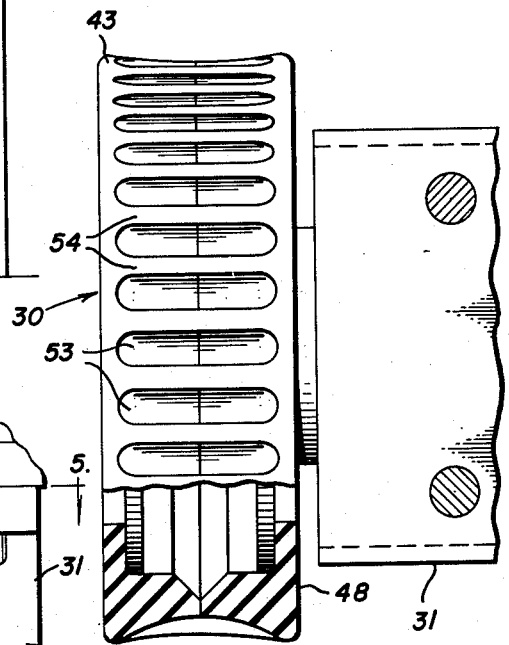
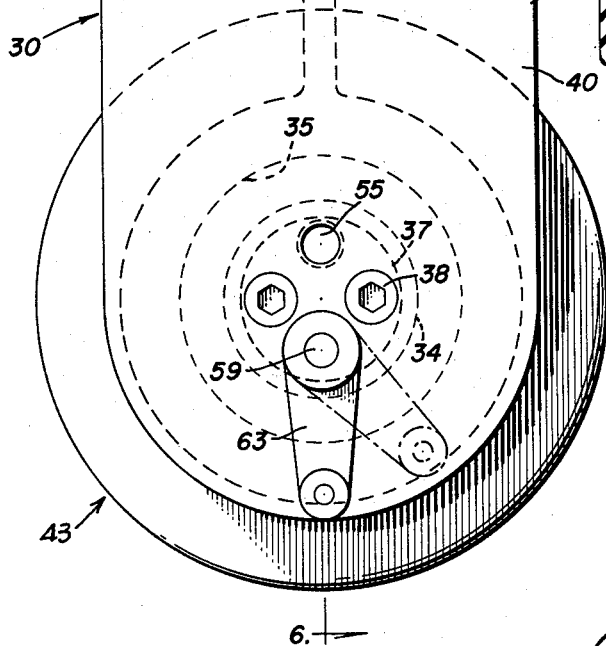

Nov. 3, 1964 V. S. BUCCICONE 3,155,387
SHEET HANDLING APPARATUS
Filed Oct. 9, 1962 3 Sheets-Sheet 3
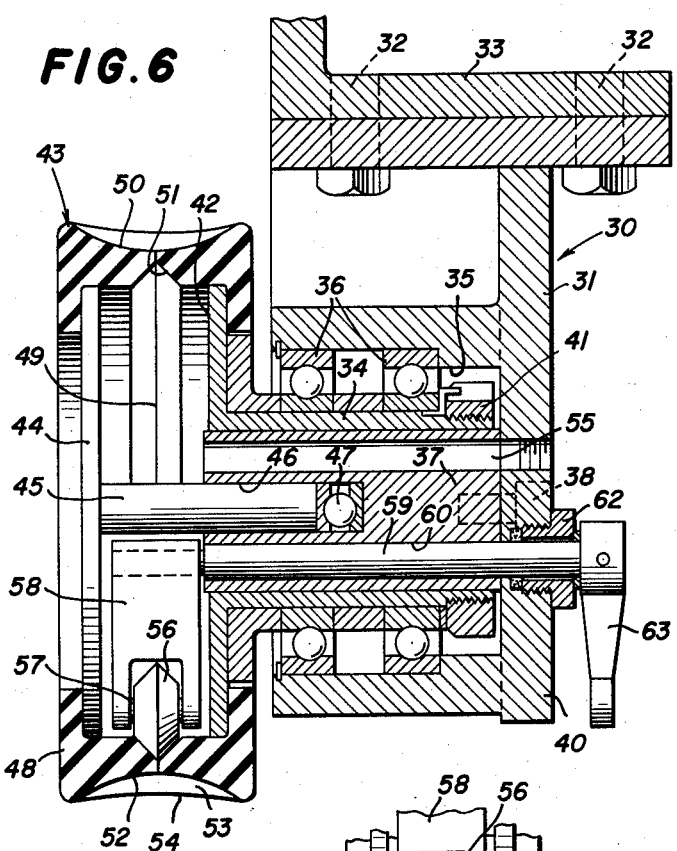
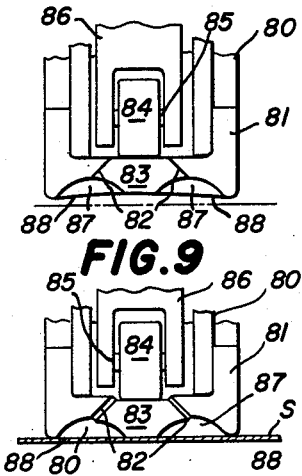
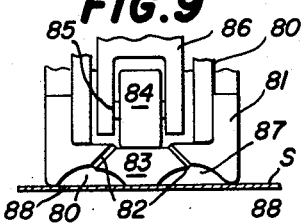
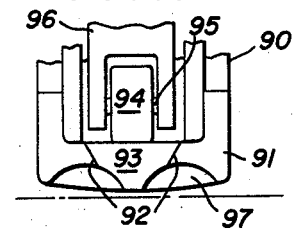
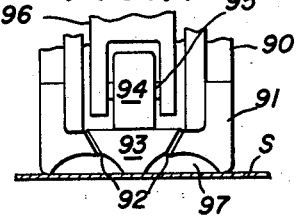
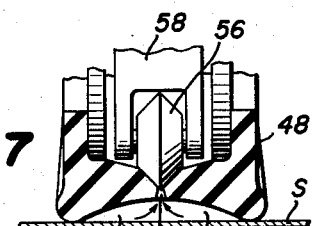
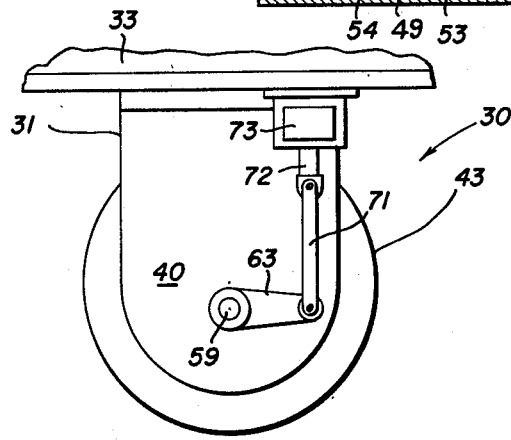
INVENTOR.
VELIO S. BUCCICONE
BY
Cromwell Greist & Warden
ATTYS.

United States Patent Office 3,155,387
Patented Nov. 3, 1964

3,155,387
SHEET HANDLING APPARATUS
Velio S. Buccicone, Gary, Ind., assignor to Buccicone Engineering Co., Inc., Gary, Ind., a corporation of Indiana
Filed Oct. 9, 1962, Ser. No. 229,341
18 Claims. (Cl. 271—74)

This invention relates to apparatus for handling sheet materials and is more particularly concerned with improvements in a conveyor which employs suction for holding sheets or similar articles against the surface of a traveling roller or wheel.

It is a general object of the invention to provide a conveyor for handling sheets or similar materials which employs one or more hollow rotating rollers or wheels which are characterized by a peripheral wall having a normally closed peripheral slot and provision for opening the slot at a predetermined location on the peripheral path so as to provide for application of suction through the roller to hold a sheet against the periphery thereof so that it is advanced in a tangential path by rotation of the roller.

It is a more specific object of the invention to provide a conveyor for sheet materials which employs one or more hollow rollers connected to a vacuum line so as to provide suction through a slitted peripheral casing on the roller with a passageway for the vacuum being maintained at a predetermined location on the surface of the roller by progressively forcing open the slit in the casing as the roller rotates.

It is a further object of the invention to provide an apparatus comprising an elongate overhead conveyor for advancing successive sheets of material delivered to one end thereof, said conveyor having a series of vacuum roller units spaced lengthwise thereof and supported thereon in depending relation, each of said vacuum roller units having a housing, a hollow shaft in said housing, a hollow roller mounted on the end of said shaft, means forming a passageway through the housing and the hollow shaft so as to connect the interior of the roller with a vacuum line, the roller having a tire-like member extending about the periphery thereof which is of rubber-like material and which is provided with a plurality of slits extending through the surface of the roller so as to provide vacuum passageways when opened, a pressure applying wheel rotatably mounted on a swingable arm within the roller, the arm being mounted on the end of a laterally extending shaft which is rotatable about an axis eccentric to the axis of rotation of the roller and means for rotating the shaft to move the pressure applying wheel into and out of engagement with the interior surface of the tire-like portion so as to progressively open and close the slits at a predetermined point on the periphery of the roller.

It is another object of the invention to provide a conveyor for handling sheets or like material which comprises an elongate supporting frame and a plurality of longitudinally spaced vacuum wheel units arranged along the length of said frame, each of which wheel units comprises a depending support member having a housing formed in the lower end thereof with a recess opening in a lateral direction, a hollow shaft mounted in the housing and a hollow wheel on the end of said shaft, the wheel having the interior thereof connected with a vacuum source and having a peripherally extending member formed of resilient rubber-like material with a plurality of circumferential slits therein which are normally closed and mechanism within the wheel for opening the slits at a predetermined point on the peripheral path thereof so as to provide a passageway for applying suction to a sheet engaging with the wheel surface.

It is a still further object of the invention to provide a sheet conveyor apparatus comprising a hollow roller or wheel which is connected to a suction line and having a rubber tire-like member on its periphery which is provided with a circumferential slit normally closed but openable by engagement therein of a small disc which is rotatably mounted within the roller and which has a peripheral surface of wedge shape in cross section.

It is another object of the invention to provide a vacuum roller or wheel of the type described with a rubber-like peripheral portion which is provided with spaced lines of circumferential slits normally closed but openable by radial movement of the material between the lines of slits through engagement therewith of a small roller mounted within the vacuum wheel and movable into and out of engagement with the rubber-like peripheral portion.

These and other objects and advantages of the invention will be apparent from a consideration of the sheet handling apparatus which is shown by way of illustration in the accompanying drawings wherein:

FIGURE 1 is an elevation, partly schematic, of a sheet piling apparatus employing an overhead conveyor having incorporated therein the principal features of the invention;

FIGURE 2 is a plan view of the conveyor shown in FIGURE 1, with portions broken away or omitted;

FIGURE 3 is a cross section taken on the line 3—3 of FIGURE 1;

FIGURE 4 is a side elevation of one of the vacuum roller or wheel assemblies to an enlarged scale;

FIGURE 5 is a plan view taken on the line 5—5 of FIGURE 4 with portions broken away;

FIGURE 6 is a cross section taken on the line 6—6 of FIGURE 4;

FIGURE 7 is a fragmentary cross section showing the vacuum wheel assembly of FIGURE 6 in sheet gripping condition;

FIGURES 8 and 9 are fragmentary cross sectional views similar to FIGURE 7 illustrating a modified form of the vacuum wheel with hatching being omitted in the interest of clarity;

FIGURES 10 and 11 are fragmentary cross sectional views similar to FIGURE 7 illustrating another modification of the vacuum wheel assembly with hatching being omitted in the interest of clarity; and FIGURE 12 is a side elevation of the vacuum wheel assembly illustrating a modified form of apparatus for operating the same.

In conveying and piling sheet materials with certain previously designed equipment, an electromagnetic or vacuum belt-type conveyor in the form of one or more overhead rail units may be used, with the sheets being held on the bottom surface of the conveyor belts by electromagnetic force or by vacuum and with associated pile forming mechanism arranged in the general relationship shown in FIGURE 1 of the drawings. Pilers of this type are shown in Patents Nos. 2,761,682, 2,973,960 and 3,020,810. The present invention is an improvement over the previous arrangements of this character.

In the piling arrangement illustrated in FIGURE 1, an overhead conveyor 10 is supported on end frames 11 and 12 by cross rails 13 and 14. An endless belt feed conveyor 15 having its delivery end supported on cross roller 16 is arranged at one end of the conveyor 10 to feed the sheets S to the entrance end of the latter. The successive sheets S are delivered to the bottom surface of the conveyor 10 and advanced to a position over the pile which is indicated at 17 on the buggy 18 and then deposited by dropping them onto the top of the pile. An end stop mechanism, indicated at 19, a back stop 20, and suitable side guides 21 are provided for stopping the advancing sheets and for guiding the trailing ends of the sheets onto the pile 17. Each of the side guides 21 may be mounted for lateral adjustment on a nut forming carriage and adjusting cross screw mechanism indicated at 22. The end stop mechanism 19 is mounted on a depending carriage 23 which is supported on a longitudinally extending screw in a slotted housing 24 with a drive motor 25 connected thereto at one end of the conveyor. The end stop mechanism 19 includes an air cylinder 26 connected by a hose 27 with a suitable air supply line.

The conveyor 10 is shown as a single rail-like unit 28 which preferably comprises a plurality of longitudinally and transversely spaced, transversely paired vacuum roller or wheel assemblies 30. Any number of the conveyor rail units 28 may be employed in side-by-side relation depending upon the width of sheet which is to be handled.

Each vacuum roller or wheel assembly 30 (FIGURES 4 to 7) comprises a housing forming support 31 which is adapted to be suspended by bolts 32 or other fastening means from an angle bar 33 forming a side member of the rail unit. A hollow shaft 34 is supported in a side opening recess 35 in the housing 31 by means of bearings 36. A cylindrical rod or shaft support of bronze or similar material 37 is secured within the hollow shaft 34 by bolts 38 extending through a depending side wall 40 of the housing 31 and into the end of the rod 37. The shaft 34 is held in the housing recess 35 at one end by a lock nut 41 and has a peripheral flange 42 on its other end which forms one side wall or end wall of the vacuum roller or wheel 43. The other side wall or end wall of the roller 43 is formed by a disc 44 fixed on the end of a shaft 45 which is rotatably mounted in an axial recess 46 in the end of the bar 37 with its end seated against a thrust bearing 47. The flange 42 and disc 44 are of the same diameter and support on their peripheral edges a peripherally extending tire-like member 48 of rubber or other material having similar resilience. The tire-like member 48 has a peripheral slit 49 which extends through the peripheral wall 50 of the member 48 from a V-shaped groove 51 on the inside thereof. The outer peripheral surface of the member 48 is generally concave about a peripherally extending axis as indicated at 52 and provided with axially extending peripherally spaced recesses 53 which are separated by the spaced transverse rib formations 54 and which function in the same manner as vacuum cups when the slit 49 is opened up. The rib formations 54 bridge the slit 49 which is normally closed. A vacuum passageway through the rod 37 is provided by axial bore 55 which extends through the wall 40 of the support housing and has a suitable connection with a vacuum line.

A slit opening roller or wheel 56 having a peripheral surface preferably conforming to the cross section of the groove 51 is mounted within the vacuum roller 43 on the shaft 57 and the latter is journaled in the bifurcated end of an arm 58 which is mounted at its other end on the end of a shaft 59 extending in rotatable relation through an axial bore 60 in the support rod 37. The axial bore 60 in which the shaft 59 is mounted is located in an eccentric position relative to the longitudinal axis of the hollow roller shaft 34 and the arm 58 is proportioned so that rotation of the shaft 59 in a clockwise direction, as viewed in FIGURE 4, forces the roller 56 into the groove 51 and opens a portion of the slot 49 at the bottom of the roller 43 as shown in FIGURE 7. The shaft 59 extends through the wall 40 of the housing 31, with a suitable air seal as indicated at 62, and carries on its outer end a lever arm 63 for operating the same.

Each of the illustrated conveyor units 28 comprises a laterally spaced pair of angle frame members 33 carrying a plurality of wheel assemblies 30 and the arm 63 for moving the slit opening wheel 56 of each vacuum roller 43 is pivotally connected to a common operating bar or rod 64 extending lengthwise of the conveyor unit and connected at one end to an air motor 65 or other power operating means. A vacuum line 66 is provided for connection to the bore 55 in each of the assemblies 30. One or more of the vacuum roller assemblies 30 at the entrance end to the conveyor 10 may be power driven as indicated in FIGURE 1 by a belt and pulley connection 67 with a suitable motor 68 so as to avoid the use of pinch rolls or any other feeding means at the sheet receiving end of the conveyor and to permit the use of minimum vacuum for advancing the sheets. An electric eye 70 operated by the passage of the sheets S on the conveyor 15 may be employed to control the operation of the air motor 65 so as to release the sheets at the proper time from the grip of the vacuum rollers 43 and permit them to be deposited on the pile 17.

An alternative arrangement for operating the arm 63 which controls the movement of the slit opening wheel 56 is illustrated in FIGURE 12 where the arm 63 is connected by a link 71 with the pole 72 of an electromagnet 73. The electromagnet 73 is, of course, connected into a circuit which is controlled by the electric eye 70 and which may include conventional timers so that the levers 63 are not all operated at one time, the time interval between the operation of the rollers 43 being set to match the speed of the sheets entering the conveyor. The timing action is started when the front edge of a sheet passes the photo-electric unit 70. By the time the front edge of the sheet reaches the first vacuum roller 43 the timer will have operated the solenoid 73 for that roller to move the lever 63 and attract the sheet to the roller surface 54. Subsequent vacuum rollers are operated in succession until the back or trailing end of the sheet passes the photoelectric cell 70 at which time all the solenoids are energized, causing all the vacuum rollers to close and release the sheet which will strike the bumper 19 and drop to the pile 17.

An alternative vacuum roller construction is illustrated in FIGURES 8 and 9. In this form of the roller 80 the tire-like member 81 is provided with two lines of slits 82 which are in outwardly diverging planes so as to leave a middle section 83 of generally truncated cone shaped cross section against the inner surface of which the slit opening wheel 84 bears. The operating wheel or roller 84 is mounted on a shaft 85 which is journaled in the bifurcated end of the pivoted support arm 86. When the support arm 86 is swung to press the roller 84 against the tire section 83, the slits 82 are opened up as illustrated in FIGURE 9. In this form of the tire member 81, the slits 82 open into concave recesses 87 which are separated by rib formations 88 and which have a suction cup effect in holding the sheet against the surface of the wheel when the slits 82 are open as in FIGURE 9 so as to allow the application of vacuum to a sheet engaging the surface of the roller 80.

Another modification of the vacuum roller is illustrated in FIGURES 10 and 11. In this form of the apparatus the roller 90 is provided with a tire member 91 having a series of diagonally extending slits 92 which are in converging relation towards the center of the member 91 and which are normally held in closed position by pressure of the operating roller 93, the latter being mounted on the shaft 94 journaled in the bifurcated end of a pivoted support arm 95. The peripheral surface of the tire member 91 has a normally convex contour with cup-shaped recesses 97 separated by rib formations 98. When the pressure on the roll 94 is released by swinging the support arm 96 in the proper direction and, the peripheral surface of the member 91 is engaged against a sheet and the tire section 93 is moved inwardly so as to open the slits 92 and allow the application of the vacuum to the sheet S.

In all forms of the vacuum roller which are illustrated, the slits are closed and there is no loss of air when the roller is not being operated to convey a sheet. When the slit opening roller is operated to open the slit or slits at the bottom of the vacuum roller, in an overhead type conveyor arrangement, in order to convey a sheet, the slit or slits around the remainder of the periphery of the roller are closed so that a minimum of vacuum is required during operation.

The vacuum rollers may be used to convey in a very efficient manner any sheet material without regard to its magnetic properties. Also, conveyors formed with the vacuum rollers may be used as regular bottom conveyors or as overhead conveyors for handling sheets in either a horizontal or inclined path.

The operation of the slit opening roller may be accomplished by means of an air motor or any other power actuating mechanism in place of the reciprocating rod of FIGURE 1 or the electromagnet of FIGURE 12.

While specific materials and particular forms of construction have been referred to in describing the several embodiments of the invention illustrated in the drawings, it will be understood that other materials and equivalent structural details may be resorted to within the spirit of the invention.

I claim:

1. A conveyor apparatus for handling sheets or similar material which comprises an elongate supporting frame and a plurality of longitudinally spaced vacuum roller units arranged along the length of said supporting frame, each of said roller units comprising a depending support member having a housing formed in the lower end thereof with a laterally opening recess, a hollow shaft rotatably mounted in said recess and a hollow roller on the end of said shaft, said roller having the interior thereof connected to a vacuum line, said roller having a peripheral wall section formed of resilient rubber-like material and a series of circumferential slits therein which are normally closed and means within the roller for opening the slits at a predetermined point on the peripheral path thereof so as to provide a passageway for applying suction to a sheet engaging with the roller surface at said point.

2. In a sheet handling apparatus which is characterized by an elongate overhead rail-like conveyor having means for advancing successive sheets of material thereto, a series of vacuum roller assemblies supported on the conveyor in longitudinal and laterally spaced depending relation, each of said roller assemblies comprising a hollow roller on the end of a hollow shaft which is mounted for rotation about a fixed rod member in a laterally opening housing depending from a frame forming portion of the conveyor, a passageway extending through said rod member for connecting the interior of the hollow roller to a vacuum line, said hollow roller having a peripheral wall which is formed of rubber-like material and a series of peripheral slits in said peripheral wall which are adapted to be opened to provide a connecting passageway for application of the vacuum to a sheet engaged with the bottom outside surface of the peripheral wall of the roller, a pressure applying wheel rotatably mounted on a swingable arm within said roller which arm is pivoted on the fixed rod on an axis parallel with and eccentric to the axis of rotation of the roller and which is movable into pressure applying engagement with the interior surface of the peripheral wall of the roller adjacent the passage forming slits and means for swinging said arm so as to move the pressure applying wheel into and out of engagement with the roller surface thereby to selectively open and close the passage forming slits.

3. An article handling apparatus comprising an elongate overhead conveyor for advancing successive sheet-like articles delivered to one end thereof, said conveyor having a series of longitudinally spaced vacuum roller units supported thereon in depending relation, each of said vacuum roller units comprising a housing, a hollow, laterally extending shaft rotatably mounted in said housing, a hollow roller mounted on the end of said shaft, means forming a passageway through the housing and the hollow shaft and connecting the interior of the roller to a vacuum line, said roller having a tire-like member extending about a portion of the periphery thereof which is of rubber-like material and which is provided with a plurality of peripheral slits forming vacuum passageways when opened, a pressure applying wheel of relatively small diameter rotatably mounted on the end of a swingable arm within the roller, said arm being fixed on the end of a laterally extending shaft which is mounted for rotation about an axis eccentric to the axis of rotation of the roller and means for rotating the shaft to move the pressure applying wheel into and out of engagement with the interior surface of the tire-like member so as to progressively open and close the slits at a predetermined point on the periphery of the roller.

4. An article conveyor comprising an elongated supporting structure and a plurality of article engaging rollers mounted on depending support members and spaced along the length thereof, said rollers each comprising a hollow cylindrical housing with a laterally extending shaft which is rotatably mounted on a support member, means connecting the hollow housing through said shaft with a vacuum line, said hollow housing having a peripheral portion encased in a rubber-like member which is divided into sections by circumferentially spaced slits so that one section may move outwardly relative to an adjoining section in a radial direction and provide passageways between the interior of the housing and the exterior surface of the casing, said openings being closed when said casing sections are in their normal position and pressure applying means within the housing for engaging one of the casing sections at a peripheral point, said means being operated to move said one casing section outwardly of its normal path at said point and provide a passageway for applying vacuum to an article engaged with the surface of the casing at said point.

5. A conveyor apparatus for handling sheets or similar material which comprises an elongate supporting frame and a plurality of longitudinally spaced vacuum roller units arranged along the length of said supporting frame, each of said roller units comprising a support member and a hollow roller rotatably mounted on said support member, means connecting the interior of said roller to a vacuum line, said roller having a peripheral wall section formed of resilient rubber-like material with circumferential slits therein which are normally closed and a device within the roller which is operative for engaging said wall section and thereby progressively opening the slits at a predetermined point on the peripheral path thereof as the roller rotates whereby to provide at said point a passageway for applying suction to a sheet engaging with the roller surface at said point.

6. A conveyor as recited in claim 5, and said roller having outwardly opening cup-shaped recesses on the peripheral surface which are separated by rib forming sections which bridge the slits in the wall section.

7. A conveyor as recited in claim 5, and said slits being in laterally spaced lines with portions of the wall section between the lines of slits being radially movable outwardly by said slit opening device.

8. In a sheet handling apparatus which is characterized by an elongate conveyor rail unit having means for advancing successive sheets thereto, a series of vacuum roller assemblies supported on the conveyor unit in longitudinal and laterally spaced relation, each of said roller assemblies comprising a hollow roller on the end of a hollow shaft, said shaft being mounted for rotation about a fixed rod member in a laterally opening housing on said conveyor, a passageway extending through said rod member for connecting the interior of the hollow roller to a vacuum line, said hollow roller having a peripheral wall which is formed of rubber-like material and a series of peripheral slits in said peripheral wall which are normally closed and which are adapted to be opened to provide a connecting passageway for application of the vacuum to a sheet in tangential engagement with the outside surface of the peripheral wall of the hollow roller, a pressure applying roller rotatably mounted on a swingable arm within said hollow roller, said arm being pivoted on the fixed rod on an axis eccentric to the axis of rotation of the hollow roller and means for moving said arm to swing the pressure applying roller into and out of engagement with the interior surface of the hollow roller adjacent the passage forming slits thereby to open the passage forming slits at a point on the path of the periphery of the hollow roller.

9. In a sheet handling apparatus comprising an elongate conveyor rail unit having means for advancing successive sheets thereto, a plurality of vacuum roller assemblies supported on the conveyor unit in longitudinal spaced relation, each of said roller assemblies comprising a hollow roller on the end of a hollow shaft, said shaft being mounted for rotation about a fixed member in a laterally opening housing on said conveyor, a passageway extending through said fixed member for connecting the interior of the hollow roller to a vacuum line, said hollow roller having a peripheral wall which is formed of rubber-like material and peripheral slits in said peripheral wall which are normally closed and which are adapted to be opened to provide a connecting passageway for application of the vacuum to a sheet advanced into tangential engagement with the outside surface of the peripheral wall of the hollow roller, a pressure applying member rotatably mounted on a swingable arm within said hollow roller, said arm being pivoted on the fixed member on an axis eccentric to the axis of rotation of the hollow roller and means for moving said arm to swing the pressure applying member into and out of engagement with the interior surface of the hollow roller so as to open the passage forming slits at a point on the path of the periphery of the hollow roller.

10. In a sheet handling apparatus comprising an elongate conveyor rail unit having means for advancing successive sheets thereto, a plurality of vacuum roller assemblies supported on the conveyor unit in longitudinal and laterally spaced relation, each of said roller assemblies comprising a hollow roller mounted on a hollow shaft, said shaft being mounted for rotation in a laterally opening housing on said conveyor, means forming a passageway for connecting the interior of the hollow roller through the hollow shaft to a vacuum line, said hollow roller having a peripheral wall portion which is formed of rubber-like material and peripheral slits in said peripheral wall portion which are normally closed and which are adapted to be opened to provide a connecting passageway for application of the vacuum to a sheet which is advanced to the conveyor so that it is in tangential engagement with the outside surface of the peripheral wall of successive hollow rollers, a pressure applying member rotatably mounted on a swingable arm within said hollow roller, said arm being pivoted on an axis eccentric to the axis of rotation of the hollow roller and means for moving said arm to swing the pressure applying member into and out of engagement with the interior surface of the peripheral wall portion of the hollow roller so as to open the passage forming slits at the point on the path of the periphery of the hollow roller where the pressure applying member engages said peripheral wall portion.

11. In a sheet handling apparatus which is characterized by an elongate conveyor rail unit having means for advancing successive sheets at an entry end thereof, a plurality of vacuum roller assemblies supported on the conveyor unit in longitudinal spaced relation, each of said roller assemblies comprising a hollow roller mounted on a hollow shaft, said shaft being mounted for rotation in a laterally opening housing on said conveyor, means forming a passageway for connecting the interior of the hollow roller to a vacuum line, said hollow roller having a peripheral wall portion which is formed of rubber-like material and peripheral slits in said peripheral wall which are normally closed and which are adapted to be opened to provide a connecting passageway for application of the vacuum to a sheet which is advanced in tangential engagement with the outside surface of the peripheral wall of the hollow roller, a pressure applying roller rotatably mounted on an arm extending in a generally radial direction within said hollow roller, said arm being carried on the inner end of a shaft having its axis parallel with and eccentric to the axis of rotation of the hollow roller, said arm carrying shaft having a lever arm on its outer end, and means for moving said lever arm to swing the pressure applying roller into and out of engagement with the interior surface of said peripheral wall portion of said hollow roller thereby to open the passage forming slits at a point on the path of the periphery of the roller which is engaged by said pressure applying roller.

12. In a sheet handling apparatus as recited in claim 11, and the means for moving said lever arm comprising a slidably mounted bar extending longitudinally of said conveyor rail unit and power means for sliding said bar.

13. In a sheet handling apparatus as recited in claim 11, and the means for moving said lever arm including a motor forming device having a reciprocating member and a link connecting said reciprocating member with said lever arm.

14. In a sheet handling apparatus as recited in claim 11, and the means for moving said lever arm including a motor on each of said roller assemblies and means for controlling the operation of said motor which is responsive to movement of the sheets.

15. In a sheet handling apparatus as recited in claim 11, and the means for moving said lever arm comprising an electromagnet which is operated in response to advancing movement of the sheets.

16. A vacuum roller assembly for an article handling conveyor apparatus comprising a rotatably mounted hollow roller having a relatively small axial dimension and a tire-like casing of rubber-like material forming a peripheral wall of the hollow roller, said casing having outwardly opening concave peripheral surface portions, a peripherally extending slit in said casing which is normally closed and means to open said slit at a predetermined point and provide a passageway at said point between the concave surface portions and the interior of the roller.

17. A vacuum roller assembly for an article handling conveyor apparatus comprising a rotatably mounted hollow roller and a casing of rubber-like material forming a peripheral wall of the hollow roller, said casing having a circumferential line of slits which are normally closed and means to open said slits at a predetermined point upon rotation of said hollow roller thereby to provide a vacuum passage for holding an article against the outside peripheral surface of said casing at said point.

18. A vacuum roller assembly for an article handling conveyor apparatus comprising a rotatably mounted hollow roller and a peripheral casing formed of material having substantial resiliency, said casing being slit circumferentially so as to divide the peripheral wall forming portion thereof into sections and means to move one of the casing sections outwardly in a radial direction and relative to the adjoining section so as to open the separating slit and form a vacuum passageway.

References Cited in the file of this patent
UNITED STATES PATENTS

| | | |
|---|---|---|
| 2,969,869 | Klingler | Jan. 31, 1961 |
| 2,973,960 | Buccicone | Mar. 7, 1961 |